United States Patent
Belverato

(10) Patent No.: US 10,747,337 B2
(45) Date of Patent: Aug. 18, 2020

(54) MECHANICAL DETECTION OF A TOUCH MOVEMENT USING A SENSOR AND A SPECIAL SURFACE PATTERN SYSTEM AND METHOD

(71) Applicant: BRAGI GmbH, München (DE)

(72) Inventor: Luigi Belverato, München (DE)

(73) Assignee: BRAGI GmbH, Munich (DE)

( * ) Notice: Subject to any disclaimer, the term of this patent is extended or adjusted under 35 U.S.C. 154(b) by 9 days.

(21) Appl. No.: 15/490,397

(22) Filed: Apr. 18, 2017

(65) Prior Publication Data

US 2017/0308182 A1 Oct. 26, 2017

Related U.S. Application Data

(60) Provisional application No. 62/327,729, filed on Apr. 26, 2016.

(51) Int. Cl.
*H04R 1/10* (2006.01)
*G06F 1/16* (2006.01)
(Continued)

(52) U.S. Cl.
CPC ............ *G06F 3/0346* (2013.01); *G06F 1/163* (2013.01); *G06F 3/017* (2013.01); *G06F 3/0416* (2013.01); *H04R 1/1016* (2013.01); *H04R 1/1041* (2013.01); *G06F 2200/1636* (2013.01); *G06F 2203/0381* (2013.01); *H04R 2201/107* (2013.01); *H04R 2420/07* (2013.01); *H04R 2430/01* (2013.01)

(58) Field of Classification Search
CPC .................. G06F 3/0346; G06F 3/041; G06F 2203/04105; H04R 1/1016; H04R 1/1041; H04R 2201/107; H04R 2420/07; H04R 2330/01
See application file for complete search history.

(56) References Cited

U.S. PATENT DOCUMENTS 3,934,100 A 1/1976 Harada
4,150,262 A 4/1979 Ono
(Continued)

FOREIGN PATENT DOCUMENTS

CN 204244472 U 4/2015
CN 104683519 A 6/2015
(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Mihir K Rayan
(74) *Attorney, Agent, or Firm* — Goodhue, Coleman & Owens, P.C.

(57) ABSTRACT

A system, method and wireless earpiece for detecting a touch event. The touch event is measured by a touch sensor and one or more of accelerometers and microphones. The touch event detected by the touch sensor and one or more of the accelerometers and microphones is analyzed. An action for the wireless earpiece associated with the touch event is determined. The action associated with the touch event is implemented.

15 Claims, 5 Drawing Sheets

US 10,747,337 B2
Page 2

(51) Int. Cl.
  *G06F 3/0346* (2013.01)
  *G06F 3/01* (2006.01)
  *G06F 3/041* (2006.01)

(56) References Cited

U.S. PATENT DOCUMENTS

| | | |
|---|---|---|
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2* | 7/2005 | Boesen ............... H04M 1/6066 340/575 |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,825,626 B2 | 11/2010 | Kozisek |
| 7,979,035 B2 | 7/2011 | Griffin et al. |
| 7,983,628 B2 | 7/2011 | Boesen |
| 8,095,188 B2 | 1/2012 | Shi |
| 8,140,357 B1 | 3/2012 | Boesen |
| 8,300,864 B2 | 10/2012 | Müllenborn et al. |
| 8,436,780 B2 | 5/2013 | Schantz et al. |
| 8,719,877 B2 | 5/2014 | VonDoenhoff et al. |
| 8,891,800 B1 | 11/2014 | Shaffer |
| 8,994,498 B2 | 3/2015 | Agrafioti et al. |
| 9,013,145 B2 | 4/2015 | Castillo et al. |
| 9,037,125 B1 | 5/2015 | Kadous |
| 9,081,944 B2 | 7/2015 | Camacho et al. |
| 9,510,159 B1 | 11/2016 | Cuddihy et al. |
| 9,541,966 B2* | 1/2017 | Williams ............... G06F 1/1694 |
| 9,939,891 B2* | 4/2018 | Boesen ................. G06F 3/165 |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0036414 A1* | 2/2003 | Huang ............... H04M 1/6066 455/569.2 |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0013410 A1* | 1/2006 | Wurtz ................. H04R 1/1033 381/74 |
| 2006/0029246 A1 | 2/2006 | Boesen |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0258412 A1 | 11/2006 | Liu |
| 2008/0090622 A1 | 4/2008 | Kim et al. |
| 2008/0146890 A1 | 6/2008 | LeBoeuf et al. |
| 2008/0254780 A1 | 10/2008 | Kuhl et al. |
| 2009/0017881 A1 | 1/2009 | Madrigal |
| 2009/0058598 A1* | 3/2009 | Sanchez Sanchez ... G06F 21/32 340/5.83 |
| 2009/0073070 A1 | 3/2009 | Rofougaran |
| 2009/0270141 A1* | 10/2009 | Sassi ................. H04M 1/0202 455/575.1 |
| 2009/0296968 A1 | 12/2009 | Wu et al. |
| 2010/0033313 A1 | 2/2010 | Keady et al. |
| 2010/0172522 A1* | 7/2010 | Mooring ............ H04R 1/1041 381/311 |
| 2010/0194692 A1* | 8/2010 | Orr .................. G06F 3/0414 345/173 |
| 2010/0203831 A1 | 8/2010 | Muth |
| 2010/0320961 A1* | 12/2010 | Castillo ............... H04R 1/105 320/107 |
| 2011/0037720 A1* | 2/2011 | Hirukawa ............ G06F 3/0488 345/173 |
| 2011/0091059 A1* | 4/2011 | Sacha ................ H04R 25/50 381/321 |
| 2011/0096036 A1* | 4/2011 | McIntosh ............ G06F 3/043 345/177 |

(56) References Cited

U.S. PATENT DOCUMENTS

| | | | |
|---|---|---|---|
| 2011/0103609 A1* | 5/2011 | Pelland | H04R 1/1041 381/74 |
| 2011/0286615 A1 | 11/2011 | Olodort et al. | |
| 2013/0022214 A1* | 1/2013 | Dickins | G06F 3/043 381/74 |
| 2013/0113715 A1* | 5/2013 | Grant | G06F 3/0488 345/173 |
| 2014/0122116 A1 | 5/2014 | Smythe | |
| 2014/0163771 A1 | 6/2014 | Demeniuk | |
| 2014/0185828 A1 | 7/2014 | Helbling | |
| 2014/0222462 A1 | 8/2014 | Shakil et al. | |
| 2014/0270227 A1 | 9/2014 | Swanson | |
| 2014/0270271 A1 | 9/2014 | Dehe et al. | |
| 2014/0370855 A1* | 12/2014 | Koss | H04M 3/53366 455/413 |
| 2015/0002475 A1* | 1/2015 | Tiao | G06F 3/017 345/175 |
| 2015/0028996 A1 | 1/2015 | Agrafioti et al. | |
| 2015/0148989 A1 | 5/2015 | Cooper et al. | |
| 2015/0245127 A1 | 8/2015 | Shaffer | |
| 2016/0033280 A1 | 2/2016 | Moore et al. | |
| 2016/0073189 A1 | 3/2016 | Lindén et al. | |
| 2016/0353195 A1* | 12/2016 | Lott | H04R 1/1041 |
| 2017/0064426 A1* | 3/2017 | Hviid | H04R 1/1091 |
| 2017/0064432 A1* | 3/2017 | Hviid | H04R 1/1041 |

FOREIGN PATENT DOCUMENTS

| | | |
|---|---|---|
| CN | 104837094 A | 8/2015 |
| EP | 1017252 A2 | 7/2000 |
| EP | 2903186 A1 | 8/2015 |
| GB | 2074817 | 4/1981 |
| GB | 2508226 A | 5/2014 |
| JP | 06292195 | 10/1998 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014043179 A2 | 3/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 1, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, On Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Californa (2017).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & the BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

* cited by examiner ant to the normal trends of the user. If the sensor measurements deviate over time or from the normal trends of the user, one or more actions may be taken.

MECHANICAL DETECTION OF A TOUCH MOVEMENT USING A SENSOR AND A SPECIAL SURFACE PATTERN SYSTEM AND METHOD

PRIORITY STATEMENT

This application claims priority to U.S. Provisional Patent Application 62/327,729, filed on Apr. 26, 2016, and entitled Mechanical Detection of a Touch Movement Using a Sensor and a Special Surface Pattern System and Method, hereby incorporated by reference in its entirety.

BACKGROUND

I. Field of the Disclosure

The illustrative embodiments relate to wireless earpieces. More specifically, but not exclusively, the illustrative embodiments relate to wireless earpieces for receiving touch selections and selections from a user.

II. Description of the Art

The growth of wearable devices is increasing exponentially. This growth is fostered by the decreasing size of microprocessors, circuitry boards, chips, and other components. In some cases, wearable devices may obtain biometric data. An important aspect of modern electronic devices are touch sensors. Ensuring proper operation of touch screens may be difficult based on size, location, position, environment, or user activity.

SUMMARY OF THE DISCLOSURE

One embodiment of the illustrative embodiments provides a system, method and wireless earpiece for detecting a touch event. The touch event is measured by a touch sensor and one or more of accelerometers and microphones. The touch event detected by the touch sensor and one or more of the accelerometers and microphones is analyzed. An action for the wireless earpiece associated with the touch event is determined. The action associated with the touch event is implemented. Another embodiment provides wireless earpieces including a processor and a memory storing a set of instructions. The set of instructions are executed to perform the method described.

Another embodiment provides a wireless earpiece. The wireless earpiece may include a frame for fitting in an ear of a user. The wireless earpiece may also include a logic engine controlling functionality of the wireless earpiece. The wireless earpiece may also a number of sensors detecting a touch event from the user. The wireless earpiece may also include a transceiver communicating with at least a wireless device. The logic engine analyzes the touch event detected by the touch sensor and one or more of the accelerometers and microphones, determines an action associated with the touch event, and implements the action associated with the touch event.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

Figure 1:
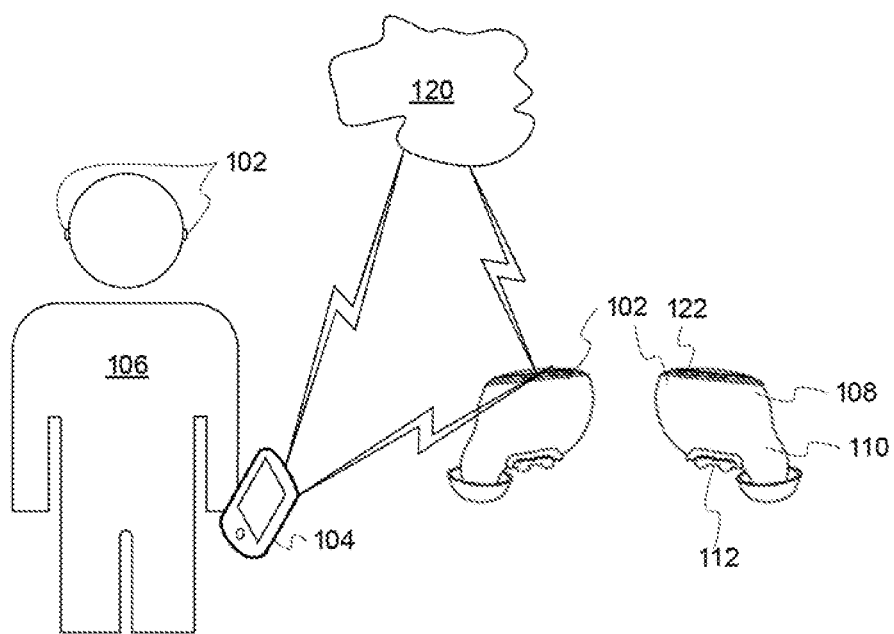
FIG. 1 is a pictorial representation of a communication system in accordance with an illustrative embodiment.

The illustrative embodiments provide a system, method, and wireless earpiece for detecting a touch input from a user. It is to be understood that elements and/or functions from different illustrative embodiments may be combined where desired or appropriate. The touch input may be detected utilizing a pattern or surface utilized for touch selections. The motion, vibrations, speed, contact, or other interactions of the user with the wireless earpieces including the associated sensors may be utilized to automatically implement specific actions. The sensors may not be specifically configured or intended to detect user input, but may be utilized alone or in combination with other sensor measurements to determine, measure, and/or verify the sensor input. The sensors may include accelerometers, gyroscopes, touch sensors, optical sensors, and microphones.

In one embodiment, a touch surface or touch sensor of the wireless earpieces may include a pattern that facilitates specific vibration patterns, noises, impacts, dynamic position of contact, direction of movement, force of contact, duration of contact or other input, parameters or conditions that may be detected by the sensors. The user input may include any number of taps, swipes, press and holds, patterned motions, or combinations of tactile input. In other embodiments, the user input may include head gestures, voice commands, or other input that may be measured, corroborated, or verified by the other sensor of the wireless earpieces. The use of various sensor assemblies may be utilized to detect touch events, determine a position associated with the touch event (e.g., position of the user, user's finger, head, etc.), and patterns of touch events.

The sensors of the wireless earpieces may also be utilized for reading user biometrics, such as pulse rate, blood pressure, blood oxygenation, temperature, calories expended, blood content, voice and audio output, impact levels, and orientation (e.g., body, head, etc.). The sensors may also determine the user's location, position, velocity, impact levels, and so forth. The sensors may also receive user input and convert the user input into commands or selections made across the personal devices of the personal area network. For example, the user input detected by the wireless earpieces may include voice commands, head motions, finger taps, finger swipes, motions or gestures, or other user inputs sensed by the wireless earpieces. The user input may be determined and converted into commands that may be sent to one or more external devices, such as a tablet computer, smart phone, or so forth.

The wireless earpieces may perform sensor measurements for the user to read any number of user input and biometrics. The readings from the user may be analyzed including measuring deviations of the sensor measurements over time, identifying trends of the sensor measurements, and comparing the sensor measurements to control data for the user. As the sensor measurements are analyzed, analysis is performed to determine whether they meet or exceed one or more thresholds or criteria. The thresholds and criteria may be set by default, the user, an administrator, a caregiver, or other parties. For example, the thresholds may include a high threshold and a low threshold (e.g., pressure, vibration, speed of finger movement, etc.) that may be utilized to determine whether an event is triggered by the wireless earpieces based on the sensed input. The event may include a communication to the user including an indicator that the event is being implemented. The indicator may also specify the user's biometrics or sensor readings that triggered the event as well as the thresholds themselves so that the user may be alerted. The warning may include information, such as trends in sensor measurements, potential condition of the user, and other applicable information.

The wireless earpieces may also be utilized to control, communicate, manage, or interact with a number of other wearable or electronic devices, such as smart glasses, helmets, smart glass, watches or wrist bands, chest straps, implants, displays, clothing, cell phones, tables, computers, or so forth. The wireless earpieces may also be part of a personal area network. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, near field magnetic induction (NFMI), Bluetooth, Z-Wave, ZigBee, Wi-Fi, ANT+ or other applicable radio frequency signals. In one embodiment, the personal area network may move with the user.

The illustrative embodiments provide for the efficient use of available space within the wireless earpieces to detect user input and biometrics. As a result, the wireless earpieces may operate more efficiently. In addition, the accuracy of the wireless earpieces is enhanced. For example, touch events may be detected in regular environments, underwater, in extensive humidity, and so forth.

FIG. 1 is a pictorial representation of a communication environment 100 in accordance with an illustrative embodiment. The wireless earpieces 102 may be configured to communicate with each other and with one or more wireless devices, such as a wireless device 104. The wireless earpieces 102 may be worn by a user 106 and are shown as worn and separately from their positioning within the ears of the user 106 for purposes of visualization. A block diagram of the wireless earpieces 102 if further shown in FIG. 3 to further illustrate components and operation of the wireless earpieces 102.

In one embodiment, the wireless earpieces 102 includes a frame 108 shaped to fit substantially within the ears of the user 106. The frame 108 is a support structure that at least partially encloses and houses the electronic components of the wireless earpieces 102. The frame 108 may be composed of a single structure or multiple structures that are interconnected. The frame 108 defines an extension 110 configured to fit substantially within the ear of the user 106. The extension 110 may house one or more speakers or vibration components for interacting with the user. The extension 110 may be removably covered by one or more sleeves. The sleeves may be changed to fit the size and shape of the user's ears. The sleeves may come in various sizes and have extremely tight tolerances to fit the user 106 and one or more other users that may utilize the wireless earpieces 102 during their expected lifecycle. In another embodiment, the sleeves may be custom built to support the interference fit utilized by the wireless earpieces 102 while also being comfortable while worn.

In one embodiment, the frame 108 or the extension 110 (or other portions of the wireless earpieces 102) may include sensors 112 for sensing pulse, blood oxygenation, temperature, voice characteristics, skin conduction, glucose levels, impacts, activity level, position, location, orientation, as well as any number of internal or external user biometrics. In other embodiments, the sensors 112 may be internally positioned within the wireless earpieces 102. For example, the sensors 112 may represent metallic contacts, optical interfaces, or micro-delivery systems for receiving and delivering information. Small electrical charges may be sensed as well as passed through the sensors 112 to analyze the biometrics of the user 106 including pulse, skin conductivity, blood analysis, sweat levels, band so forth. Sensors 112 may also be utilized to provide a small electrical current which may be useful for alerting the user, stimulating blood flow, alleviating nausea, or so forth.

In some applications, temporary adhesives or securing mechanisms (e.g., clamps, straps, lanyards, extenders, chargers, clips, etc.) may be utilized to ensure that the wireless earpieces 102 remain in the ears of the user 106 or are not lost if they fall from the ears of the user 106 even during the most rigorous and physical activities. For example, the wireless earpieces 102 may be utilized during marathons, swimming, team sports, biking, hiking, parachuting, or so forth. The wireless earpieces 102 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions. The wireless device 104 or the wireless earpieces 102 may communicate directly or indirectly with one or more wired or wireless networks, such as a network 120. The wireless earpieces 102 may include logic for dynamically configuring components of the wireless earpieces 102, such as speakers and microphones, to the conditions of the communication environment 100.

The wireless earpieces 102 may determine their position with respect to each other as well as the wireless device 104. For example, position information for the wireless earpieces 102 and the wireless device 104 may determine proximity of the devices in the communication environment 100. For example, global positioning information, wireless triangulation, or signal strength/activity may be utilized to determine proximity and distance of the devices to each other in the communication environment 100. In one embodiment, the distance information may be utilized to determine whether the wireless earpieces 102 are both being worn (e.g., should be experiencing similar environmental conditions, noise, etc.).

In one embodiment, the wireless earpieces 102 and the corresponding sensors 112 (whether internal or external) may be configured to take a number of measurements or log information during normal usage. The sensor measurements may be utilized to extrapolate other measurements, factors, or conditions applicable to the user 106. For example, the sensors 112 may monitor the user's heartbeat or EKG to determine the user's unique pattern or characteristics. The user 106 or another party may configure the wireless earpieces 102 directly or through a connected device and app (e.g., mobile app with a graphical user interface) to store or share information, audio, images, and other data. Some examples of standard usage may include detecting and recording a heartbeat, setting a biometric for transaction authentication, setting noise thresholds and the associated speaker volume level or microphone sensitivity, setting a gesture/input for performing an action (e.g., playing music, opening an application, providing an audio indication of biometric feedback, etc.), active participation in a conversation, listening to music, or so forth.

The wireless earpieces 102 may reconfigure themselves during an initial set up process, during start up, during regular use, or in response to a user request. In one embodiment, each of the sensors 112 of the wireless earpieces 102 may perform baseline readings to determine readings when the communications environment 100 is quiet, slightly noise, and loud. For example, the communications environment 100 may include the user's home, commute, work out areas, office, mechanical shop, sports venue, and so forth without limitation. In one embodiment, the wireless earpieces 102 may determine a default configuration for the speakers and microphones based on a determined location. The speakers and microphones may then be further self-adjusted based on the real-time noise levels in the determined location to adjust to the optimal configuration for the wireless earpieces 102

The wireless earpieces 102 may include any number of sensors 112 and logic for measuring and determining user biometrics, such as pulse rate, skin conduction, blood oxygenation, temperature, calories expended, voice and audio output, position, and orientation (e.g., body, head, etc.). The sensors 112 may also determine the user's location, position, velocity, impact levels, and so forth. The sensors 112 may also receive user input and convert the user input into commands or selections made across the personal devices of the personal area network. For example, the user input detected by the wireless earpieces 102 may include voice commands, head motions, finger taps, finger swipes, motions or gestures, vibration, directional input, speed of input, or other user inputs sensed by the wireless earpieces. The user input may be measured by the wireless earpieces 102 and converted into internal commands or external commands that may be sent to one or more external devices, such as the wireless device 104, a tablet computer, or so forth. For example, the user 106 may create a specific head motion and voice command that when detected by the wireless earpieces 102 are utilized to automatically adjust to noise levels in the communications environment 100 or increase or decrease the volume.

The sensors 112 may make all of the measurements with regard to the user 106 or may communicate with any number of other sensory devices in the communication environment 100 to measure information and data about the user 106 as well as the communication environment 100 itself. In one embodiment, the communication environment 100 may represent all or a portion of a personal area network. The wireless earpieces 102 may be utilized to control, communicate, manage, or interact with a number of other wearable devices or electronics, such as smart glasses, helmets, smart glass, watches or wrist bands, other wireless earpieces, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, Z-Wave, Zig-Bee, Wi-Fi, ANT+ or other applicable radio frequency signals. In one embodiment, the personal area network may move with the user 106.

In other embodiments, the communication environment 100 may include any number of devices, components, or so forth that may communicate with each other directly or indirectly through a wireless (or wired) connection, signal, or link. The communication environment 100 may include one or more networks and network components and devices represented by the network 120, such as routers, servers, signal extenders, intelligent network devices, computing devices, or so forth. In one embodiment, the network 120 of the communication environment 100 represents a personal area network as previously disclosed. The network 120 may also represent a number of different network types and service providers.

Communications within the communication environment 100 may occur through the network 120 or may occur directly between devices, such as the wireless earpieces 102 and the wireless device 104, or indirectly through a network, such as a Wi-Fi network. The network 120 may communicate with or include a wireless network, such as a Wi-Fi, cellular (e.g., 3G, 4G, 5G, PCS, GSM, etc.), Bluetooth, or other short range or long range radio frequency network. The network 120 may also include or communicate with any number of hard wired networks, such as local area networks, coaxial networks, fiber-optic networks, network adapters, or so forth. Communications within the communication environment 100 may be operated by one or more users, service providers (e.g., secure, public, private, etc.), or network providers.

The wireless earpieces 102 may play, communicate, or utilize any number of alerts or communications to indicate that the status of the self-configuration process. For example, one or more alerts may indicate when dynamic adjustments are pending (e.g., self and exterior analysis), in process, require user interaction, and/or are completed with specific tones, verbal acknowledgements, tactile feedback, or other forms of communicated messages. For example, an alert may be played during each stage or the configuration process. The corresponding alert may also be communicated to the user 106, and the wireless device 104.

In other embodiments, the wireless earpieces 102 may also vibrate, flash, play a tone or other sound, or give other indications of the automatic self-configuration process status in order to prompt user actions (e.g., providing a manual adjustment, provide additional feedback, etc.) or implement any number of associated steps. The wireless earpieces 102 may also communicate an alert to the wireless device 104 that shows up as a notification, message, or other indicator indicating the necessity for configuration/re-configuration or a changed status of the configuration process, such as an audio alert that "the volume has been automatically adjusted for environmental noise."

The wireless earpieces 102 as well as the wireless device 104 may include logic for automatically implementing self-configuration and set-up for self-configuration in response to wireless earpiece set-up, start-up, condition changes (e.g., location, activities, etc.), event happenings, user requests or various other conditions and factors of the communication environment 100. For example, the wireless device 104 may communicate instructions received from the wireless earpieces 102 for the user 106 to provide feedback if the user does not agree with the new volume settings and microphone sensitivity. The wireless device 104 may include an application that displays instructions and information to the user 106 in response to configuration being needed or required.

In one embodiment, the wireless device 104 may utilize short-range or long-range wireless communications to communicate with the wireless earpieces 102 through a wireless signal or devices of the communication environment 100. For example, the wireless device 104 may include a Bluetooth and cellular transceiver within the embedded logical components. For example, the wireless signal may be a Bluetooth, Wi-Fi, Zigbee, Ant+, near-field magnetic induction (NFMI), or other short range wireless communication.

The wireless device 104 may represent any number of wireless or wired electronic communications or computing devices, such as smart phones, laptops, desktop computers, control systems, tablets, displays, gaming devices, music players, personal digital assistants, vehicle systems, or so forth. The wireless device 104 may communicate utilizing any number of wireless connections, standards, or protocols (e.g., near field communications, NFMI, Bluetooth, Wi-Fi, wireless Ethernet, etc.). For example, the wireless device 104 may be a touch screen cellular phone that communicates with the wireless earpieces 102 utilizing Bluetooth communications. The wireless device 104 may implement and utilize any number of operating systems, kernels, instructions, or applications that may make use of the available sensor data sent from the wireless earpieces 102. For example, the wireless device 104 may represent any number of android, iOS, Windows, open platforms, or other systems and devices. Similarly, the wireless device 104 or the wireless earpieces 102 may execute any number of applications that utilize the user input, proximity data, biometric data, and other feedback from the wireless earpieces 102 to initiate, authorize, or perform configuration and the associated tasks.

As noted, the layout of the internal components of the wireless earpieces 102 and the limited space available for a product of limited size may affect where the sensors 112 and other components may be positioned. The positions of the sensors 112 within each of the wireless earpieces 102 may vary based on the model, version, and iteration of the wireless earpiece design and manufacturing process. In one embodiment, one or more portions of each of the left and right wireless earpieces 102 may include one or more touch sensors 122. In one embodiment, the touch sensors 122 are positioned on a portion of the wireless earpieces 102 accessible to the user when worn in the ears of the user 106. For example, the touch sensors 122 may be easily accessed to the fingers or hand of the user 106 to receive taps, swipes, feedback, or other input.

In one embodiment, the touch sensors 122 may represent a flat or smooth surface. In other embodiments, the touch sensors 122 may include micro-extensions (e.g., nubs, ridges, protrusions, etc.) utilized to detect touch input from the user 106. The extensions (not shown) may be fixed or flexible. In addition, the extensions themselves may include piezo electric sensors, electrodes, touch sensors, thermal sensors, infrared sensors, or other electrical components or sensors. For example, the touch sensors 122 may have a raised grid that may facilitate the generation of vibrations, impacts, sounds, or other detectable input by the sensors 112 of the wireless earpieces 102.

Figure 2:
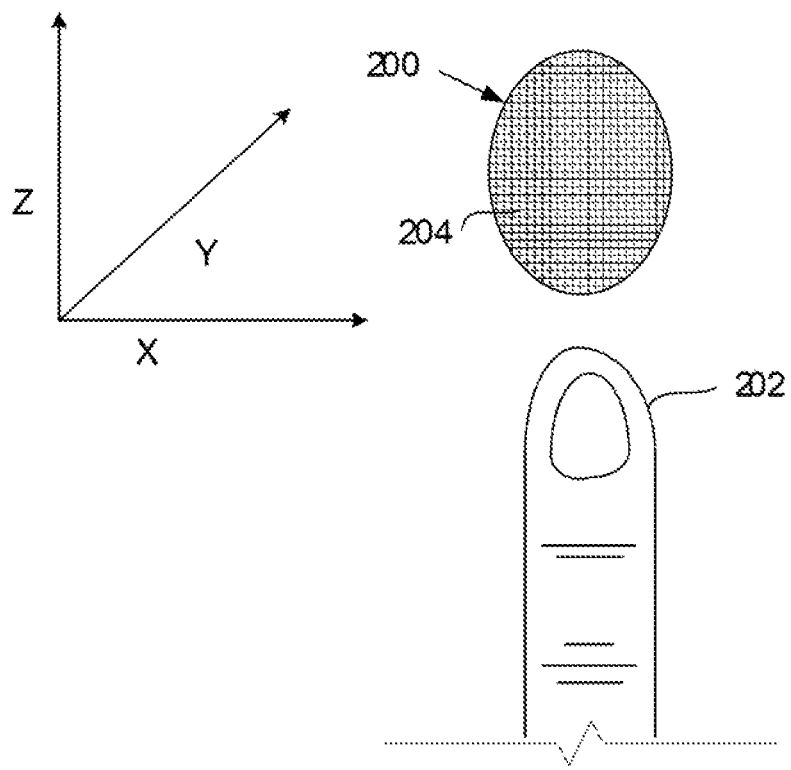
FIG. 2 is a pictorial representation of a touch sensor of a wireless earpiece in accordance with an illustrative embodiment.

FIG. 2. is a pictorial representation of a touch sensor 200 of a wireless earpiece in accordance with an illustrative embodiment. The touch sensor 200 is one example of the touch sensors 122 of the wireless earpieces 102 of FIG. 1. The touch sensor 200 may be configured to be selected by one or more fingers (or body parts) of the user, such as finger 202.

In one embodiment, the touch sensor 200 may include a pattern 204. The pattern 204 may represent micro-extensions (e.g., nubs, ridges, protrusions, etc.) utilized to detect touch input. The pattern 204 may also represent any number of sensors, detectors, pixels, or portions of the touch sensor. For example, the pattern 204 may facilitate detection of an initial position of the finger 202, a direction of motion, speed of motion, pattern traced out by the finger 202, ending position of the finger 202, force imparted by the finger 202, and other conditions, parameters, factors, or measurements. The touch sensor 200 may be pre-programmed to implement distinct actions based on the detected measurements of the finger 202 including location, position, force, speed, pattern, direction, finger used, and so forth. The pattern 204 may be utilized to generate vibrations, sounds, forces, or other input that may be detected by the sensors of the wireless earpieces. For example, one or more accelerometers integrated with the wireless earpieces may detect vibrations, forces, or motion in the x, y, and z axis. The accelerometers may work with the touch sensor 200 to determine an initial point of contact of the finger 202, whether the input is a tap or multiple taps, a direction associated with a swiping motion, a pattern or motion associated with the contact.

In one embodiment, the touch sensor 200 may also include multiple accelerometers, gyroscopes, or other sensors beyond the sensors of the touch sensor 200. For example, accelerometers may be integrated in a micro-electro-mechanical systems (MEMS) that may be part of a circuit, wafer, circuit board, chip, or other component that makes up the touch sensor 200. The touch sensor 200 may also include optical sensors that detect motion or other input in front of or proximate the touch sensor 200. The touch sensor 200 may be configured to read fingerprints or other biometrics for the wireless earpieces to implement specific actions based on the finger 202 utilized by the user.

Figure 3:
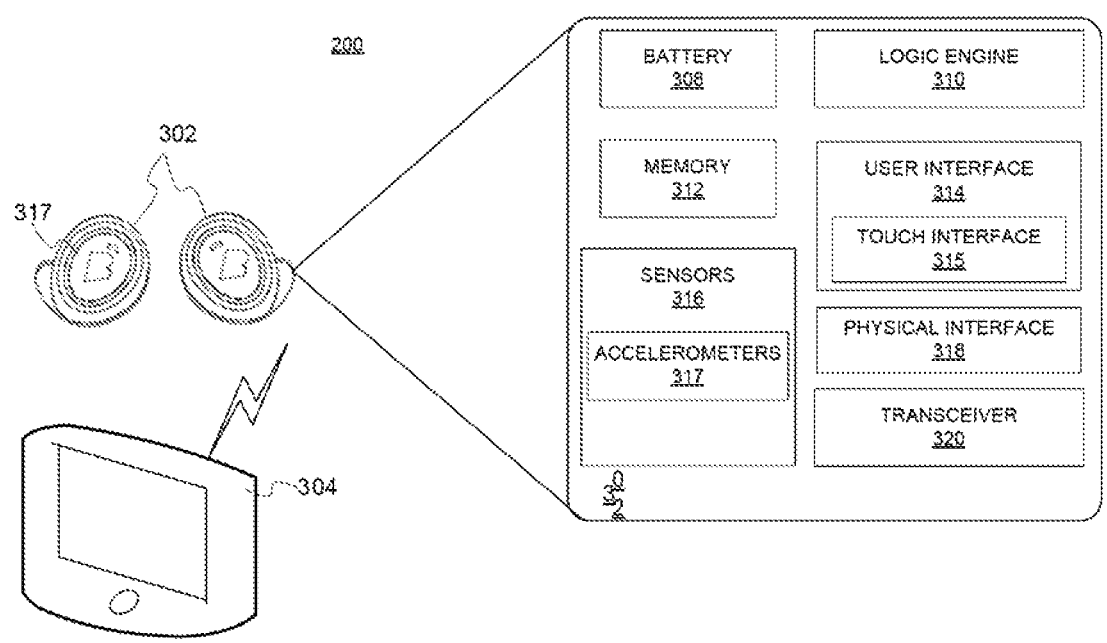
FIG. 3 is a block diagram of wireless earpieces in accordance with an illustrative embodiment.

FIG. 3 is a block diagram of a wireless earpiece system 300 in accordance with an illustrative embodiment. In one embodiment, the wireless earpiece system 300 may include wireless earpieces 302 (described collectively rather than individually). In one embodiment, the wireless earpiece system 300 may enhance communications and functionality of the wireless earpieces 302.

As shown, the wireless earpieces 302 may be wirelessly linked to a computing device 304. For example, the computing device 304 may represent a wireless tablet computer. User input and commands may be received from either the wireless earpieces 302 or the computing device 304 for implementation on either of the devices of the wireless earpiece system 300 (or other externally connected devices). As previously noted, the wireless earpieces 102 may be referred to or described herein as a pair or set (wireless earpieces) or singularly (wireless earpiece). The description may also refer to components and functionality of each of the wireless earpieces 302 collectively or individually.

In some embodiments, the computing device 304 may act as a logging tool for receiving information, data, or measurements made by the wireless earpieces 302. For example, the computing device 304 may download data from the wireless earpieces 302 in real-time. As a result, the computing device 304 may be utilized to store, display, and synchronize data to the wireless earpieces 302. In one example, the computing device 304 may execute an application that prompts the user to enter a specific type of input (e.g. tap, swipe, patterned touch, positioned touch, etc.)

utilizing the wireless earpieces 302. The input from a variety of sensors 316 may then be associated with the type of input. The computing device 304 and the wireless earpieces 302 may also prompt the user to perform activities commonly being performed by the user (e.g., jogging, walking, swimming, biking, sitting, etc.) while receiving the specified input for more accurate readings. For example, vibrations, audio input, force of contact, direction of contact, duration of contact, patterns of contact, and other characteristics may be recorded. The computing device 304 may also request that the input be received in applicable environments (e.g., outdoors, in a classroom, underwater, in high humidity, etc.).

In another example, the computing device 304 may display pulse, blood pressure, blood oxygenation, temperature, distance, calories burned, and so forth as measured by the wireless earpieces 302. The computing device 304 may be configured to receive and display alerts that indicate a specific health event or condition has been met. For example, if the forces applied to the sensors 316 (e.g., accelerometers) indicates that the user may have experienced a concussion or serious trauma, the wireless earpieces 302 may generate and send a message to the computing device 304. The wireless earpieces 302 and the computing device 304 may have any number of electrical configurations, shapes, and colors and may include various circuitry, connections, and other components.

In one embodiment, the wireless earpieces 302 may include a battery 308, a logic engine 310, a memory 312, a user interface 314, a touch interface 315, sensors 316, accelerometers 317, a physical interface 318, and a transceiver 320. The computing device 304 may have any number of configurations and include components and features as are known in the art.

The battery 308 is a power storage device configured to power the wireless earpieces 302. Likewise, the battery 318 is a power storage device configured to power the computing device 304. In other embodiments, the battery 308 may represent a fuel cell, thermal electric generator, piezo electric charger, solar cell, ultra-capacitor, or other existing or developing power generation or storage technologies.

The logic engine 310 is the logic that controls the operation and functionality of the wireless earpieces 302. The logic engine 310 may include circuitry, chips, and other digital logic. The logic engine 310 may also include programs, scripts, and instructions that may be implemented to operate the logic engine 310. The logic engine 310 may represent hardware, software, firmware, or any combination thereof. In one embodiment, the logic engine 310 may include one or more processors. The logic engine 310 may also represent an application specific integrated circuit (ASIC) or field programmable gate array (FPGA). The logic engine 310 may utilize information from the sensors 312 to determine the input and biometric information, data, and readings of the user. The logic engine 310 may also analyze the sensor measurements to determine when input is being received based on parameters, variables, or thresholds. The logic engine 302 may utilize this information and other criteria to implement specific actions or events. The logic engine 302 may send instructions or commands to the user interface 314 to provide indicators, alerts, and information to the wearer of the wireless earpieces (e.g., audibly, through an application of a connected device, tactilely, etc.). For example, the logic engine 302 may send warnings, alerts, pop-ups, audio communications, tactile feedback, or other messages. The logic engine 310 may also manage communications with the computing device 304 through the transceiver 320.

The logic engine 310 may also process user input sensed by the sensors 315 to determine commands implemented by the wireless earpieces 302 or sent to the wireless earpieces 303 through the transceiver 320. Specific actions may be associated with pre-defined or default thresholds and data. For example, the logic engine 310 may implement a macro allowing the user to associate input sensed by the sensors 316 with specified commands, alerts, and so forth. For example, if both the voice command and detected vibrations indicate that the user wants to track biometrics, an audible alert may be played to the user indicating that biometric tracking has been activated.

In one embodiment, a processor included in the logic engine 310 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 312 is a hardware element, device, or recording media configured to store data or instructions for subsequent retrieval or access at a later time. The memory 312 may represent static or dynamic memory. The memory 312 may include a hard disk, random access memory, cache, removable media drive, mass storage, or configuration suitable as storage for data, instructions, and information. In one embodiment, the memory 312 and the logic engine 310 may be integrated. The memory may use any type of volatile or non-volatile storage techniques and mediums. The memory 312 may store information related to the status of a user, wireless earpieces 302, computing device 304, and other peripherals, such as a wireless device, smart glasses, smart watch, smart case for the wireless earpieces 302, wearable device, and so forth. In one embodiment, the memory 312 may display instructions, programs, drivers, or an operating system for controlling the user interface 314 including one or more LEDs or other light emitting components, speakers, tactile generators (e.g., vibrator), and so forth. The memory 312 may also store the parameters, thresholds, conditions, or biometric data (e.g., biometric and data library) associated with user input.

The transceiver 320 is a component comprising both a transmitter and receiver which may be combined and share common circuitry on a single housing. The transceiver 320 may communicate utilizing Bluetooth, Wi-Fi, ZigBee, Ant+, near field communications, NFMI, wireless USB, infrared, mobile body area networks, ultra-wideband communications, cellular (e.g., 3G, 4G, 5G, PCS, GSM, etc.), infrared, or other suitable radio frequency standards, networks, protocols, or communications. The transceiver 320 may also be a hybrid transceiver that supports a number of different communications. For example, the transceiver 320 may communicate with the computing device 304 utilizing Bluetooth communications and inter wireless earpiece communications (e.g., between the left and right wireless earpieces) may be NFMI communications.

The components of the wireless earpieces 302 may be electrically connected utilizing any number of wires, contact points, leads, busses, wireless interfaces, or so forth. In addition, the wireless earpieces 302 may include any number of computing and communications components, devices or elements which may include busses, motherboards, circuits, chips, sensors, ports, interfaces, cards, converters, adapters, connections, transceivers, displays, antennas, and other similar components. The physical interface 318 is hardware interface of the wireless earpieces 302 for connecting and communicating with the computing device 304 or other electrical components, devices, or systems.

The physical interface 318 may include any number of pins, arms, or connectors for electrically interfacing with the contacts or other interface components of external devices or other charging or synchronization devices. For example, the physical interface 318 may be a micro USB port. In one embodiment, the physical interface 318 is a magnetic interface that automatically couples to contacts or an interface of the computing device 304. In another embodiment, the physical interface 318 may include a wireless inductor for charging the wireless earpieces 302 without a physical connection to a charging device.

The user interface 314 is a hardware interface for receiving commands, instructions, or input through the touch (haptics) of the user, voice commands, or predefined motions. The user interface 314 may be utilized to control the other functions of the wireless earpieces 302. The user interface 314 may include the LED array, one or more touch sensitive buttons or portions (e.g., the touch interface 315), a miniature screen or display, or other input/output components. The user interface 314 may receive input and feedback from the user and may be controlled by the logic engine 310 or based on commands received from the computing device 304 or a linked wireless device.

In one embodiment, the user may provide input by tapping the user interface 314 once, twice, three times, or any number of times. Similarly, a swiping motion may be utilized across or in front of the user interface 314 (e.g., the exterior surface of the wireless earpieces 302) to implement a predefined action. Swiping motions in any number of directions or gestures may be associated with specific activities, such as play music, pause, fast forward, rewind, activate a digital assistant (e.g., Siri, Cortana, smart assistant, etc.). The swiping motions may also be utilized to control actions and functionality of the computing device 304 or other external devices (e.g., smart television, camera array, smart watch, etc.). The user may also provide user input by moving his head in a particular direction or motion or based on the user's position or location. For example, the user may utilize voice commands, head gestures, or touch commands to change the content displayed by the computing device 304. The user interface 314 may also provide a software interface including any number of icons, soft buttons, windows, links, graphical display elements, and so forth. The user interface 314 and the sensors 316 may work together to detect, identify, and verify input for implementation by the wireless earpieces 302 as specific actions.

The sensors 316 may include the accelerometers 317 as well as any number of pulse oximeters, gyroscopes, magnetometers, thermometers, microphones (e.g., ear-bone, external, etc.), inertial sensors, photo detectors, miniature cameras, and other similar instruments for detecting vibrations, finger position, touch patterns, touch locations, user location, forces or impact, orientation, motion, and so forth. The sensors 316 may also be utilized to gather optical images, data, and measurements and determine an acoustic noise level, electronic noise in the environment, ambient conditions, and so forth. The sensors 316 may provide measurements or data that may be utilized to filter or select input utilized by the wireless earpieces 302. For example, a user-specified input may be utilized to enter a tracking mode for a user that is jogging. For example, motion or sound detected on the left side of the user may be utilized to command the computing device 304 to display camera images from the left side of the user. Motion or sound may be utilized, however, any number of other verifying triggers may be utilized to confirm input received by the user interface 314. The sensors 316 may read both user data as well as environmental data.

The computing device 304 may include components similar in structure and functionality to those shown for the wireless earpieces 302. The computing device may include any number of processors, batteries, memories, busses, motherboards, chips, transceivers, peripherals, sensors, displays, cards, ports, adapters, interconnects, and so forth. In one embodiment, the computing device 304 may include one or more processors and memories for storing instructions. The instructions may be executed as part of an operating system, application, browser, or so forth to implement the features herein described. In one embodiment, the wireless earpieces 302 may be magnetically or physically coupled to the computing device 304 to be recharged or synchronized or to be stored.

In another embodiment, the computing device 304 may also include sensors for detecting the location, orientation, and proximity of the wireless earpieces 302. For example, the computing device 304 may include optical sensors or cameras for capturing user input, voice commands, images, and other content. Input received by the computing device 304 may be utilized to confirm or verify input received by the wireless earpieces 302. When providing sensor information, the wireless earpieces 302 may utilize and detect any number of wavelengths and spectra to provide distinct input, images, enhancement, data, and biometrics of the user.

As originally packaged, the wireless earpieces 302 and the computing device 304 may include peripheral devices such as charging cords, power adapters, inductive charging adapters, solar cells, batteries, lanyards, additional light arrays, speakers, smart case covers, transceivers (e.g., Wi-Fi, cellular, etc.), or so forth.

Figure 4:
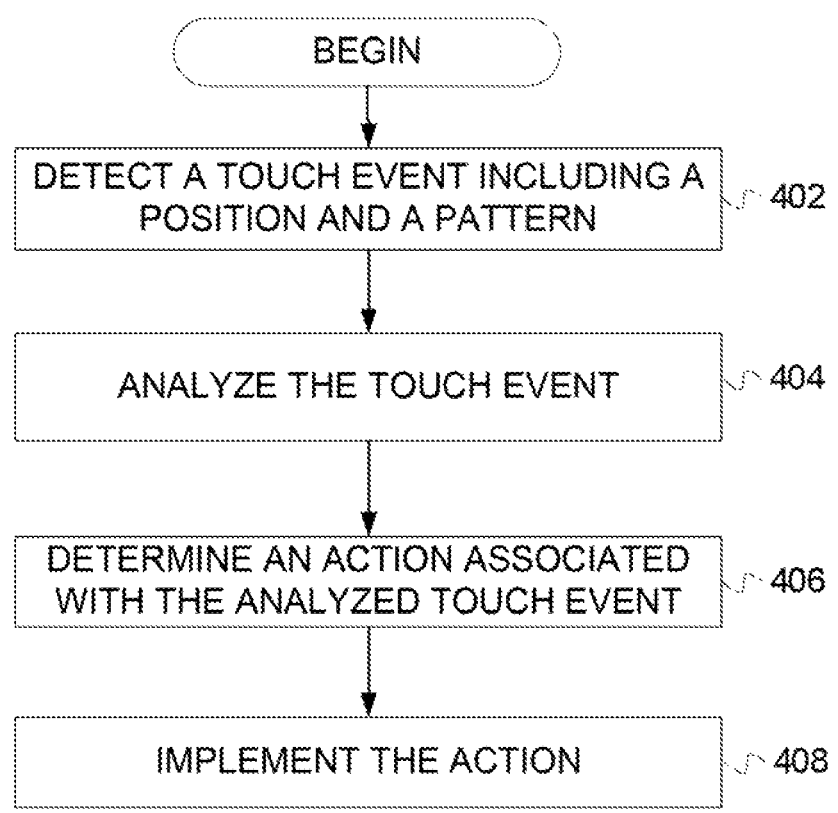
FIG. 4 is a flowchart of a process for implementing a user selected action in accordance with an illustrative embodiment.

FIG. 4 is a flowchart of a process for implementing a user selected action in accordance with an illustrative embodiment. The process of FIG. 4 may be implemented by one or more wireless earpieces, wearable devices, and any number of other devices communicating directly or through a personal area network. In one embodiment, the process of FIG. 4 may be implemented by one or more wireless earpieces, such as the wireless earpieces 102 of FIG. 1. For example, the method of FIG. 4 may be performed for both of the wireless earpieces as a pair/set or for each of wireless earpieces individually.

In one embodiment, the process of FIG. 4 may begin by detecting a touch event including a position and a pattern (step 402). As previously described, the touch sensor of each of the wireless earpieces may include a number of sensors providing a specified resolution for detecting the touch event. In one embodiment, the touch sensor or touch sensitive area of the wireless earpieces may be divided into sections, pixels, areas, patterns, or other divisions for both detecting the touch event as well as characterizing the touch event. The touch sensor may detect initial position, final position, direction, pattern, speed, and so forth. The touch sensor may also include a pattern, protrusions, or extensions for generating, enhancing, facilitating, or capturing vibrations, sounds, forces, or other input as the user make selections or provides feedback. The characteristics of the touch event may be utilized to subsequently determine an action associated with the touch event. For example, the movement of the finger of the user across the surface of the touch sensor may result in specific movement and vibration patterns detectable by the touch sensor as well as one or more accelerometers, microphones, or other sensors of the wireless earpieces.

Next, the wireless earpieces analyze the touch event (step 404). During the analysis of step 404, the wireless earpieces may detect the position (e.g., initial, final, etc.), speed, and orientation of the finger (or other body part) of the user on the touch sensor. Similarly, the wireless earpieces may analyze the input of the accelerometers regarding the touch input, the motion of the user, and the physical orientation of the user. The analysis of step 404 may be utilized to determine whether the user input corresponds to a tap, swipe (e.g., left to right, right to left, top to bottom, bottom and top, etc.), or other pattern (e.g., circular motion, diagonal motion, alphanumeric entry, etc.). The wireless earpieces may also be able to detect directional motion, cadence, time periods between portions of the touch event (e.g., a pattern of taps or swiping motions), and so forth. In some embodiments, the user input may correspond to a combination of user inputs that may be utilized together. For example, biometric input or readings (e.g., voice commands, heart rate analysis, fingerprint analysis, ear mapping, etc.) may be utilized in combination with the user input to perform specified tasks. The wireless earpieces may also identify the user utilizing the wireless earpieces because different commands, instructions, routines, or processes may be associated with different touch events based on defaults, training, programs, or authorizations available to the individual user. In other embodiments, the touch sensors touch may be sensitive enough to touch not only the physical contact of the user with the sensors, but also the proximity of the user to the touch sensors. For example, infrared, optical, or other sensors may be utilized to detect virtual taps, swipes, or other motions that may be performed proximate the wireless earpieces. The variables, parameters, conditions, environment, or other factors of the touch event may be analyzed and processed during step 404. For example, the analysis may be performed differently when the user is engaged in activities, such as jogging, bicycling, or other activities where the user's input associated with the touch event may not be as precise because of the motion or activity of the user. Similarly, the touch events may be analyzed differently when the user is determined to be underwater, in a humid environment, or other environments or conditions that may affect the readings of the wireless earpieces.

Next, the wireless earpieces determine an action associated with the analyzed touch event (step 406). During step 406, the analyzed touch event may be utilized to determine the action associated with the touch event. In one embodiment, a library, database, or stored set of touch events may be associated with one or more actions specified by default, administrator, user, or other parties. The utilization of the different available sensors may provide for unique detection, analysis, and association with an action. As a result, bulkier physical buttons, switches, subassemblies, or other sensors may not be required by the wireless earpieces to accurately perform the process of FIG. 4.

Next, the wireless earpieces implement the action (step 408). The action may be associated with the wireless earpieces themselves, such as biometric tracking, communications commands (e.g., answer a call, end a call, transfer a call, mute, etc.), media commands (e.g., play, stop, fast forward, rewind, etc.), or other specific commands. The action may implement a specified activity for an application executed by the wireless earpieces. The action may also represent commands, instructions, communications or so forth that may be sent to one or more external devices, such as wireless devices, vehicles, media systems, or so forth. The action may then be implemented or executed by the one or more external devices.

In one embodiment, the wireless earpieces may perform biometric readings or user input to authenticate or identify the user and that the user is authorized to perform the process of FIG. 4 for the user. In one embodiment, the biometric readings and user input may include one or more of pulse, hand gestures, designated motions, voice amplitude, voice frequency, skin conductivity, vocabulary (e.g., spoken password, phrase, recognized speech), blood oxygenation, temperature, heart beat pattern, ear map, calories expended per time period, sweat levels, orientation, position, and so forth. For example, a user may be identified and authenticated as having permissions or access to utilize the wireless earpieces or to access specific functions before the wireless earpieces are configured to receive, analyze, and process touch events from the user.

Although not shown, in one embodiment, the process of FIG. 4 may begin by linking one or more wireless earpieces with a communications device. The wireless earpieces may be linked with a wireless communication or computing device utilizing any number of communications, standards, or protocols. For example, the devices may be linked by a Bluetooth connection. The process may require that the devices be paired utilizing an identifier, such as a passcode, password, serial number, voice identifier, radio frequency, or so forth. The wireless earpieces may be linked with the communications device and any number of other devices directly or through a network, such as a personal area network.

The illustrative embodiments provide a system, method, personal area network, and wireless earpieces for detecting a touch event utilizing two or more sensors. The sensor measurements are verified utilizing other sensors that are integrated with the wireless earpieces or based on sensor measurements from other devices. As a result, sensor measurements associated with user input are processed more efficiently allowing for smaller devices with less sensors. The user input may also be more accurately detected.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 5:
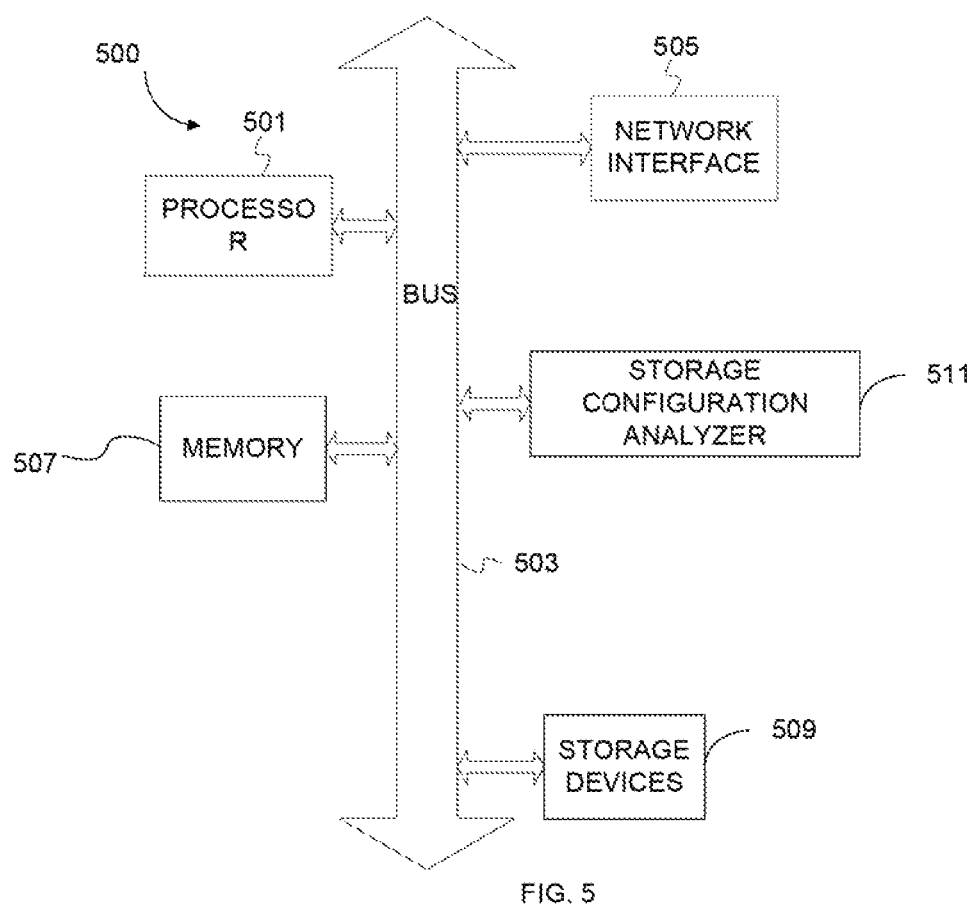
FIG. 5 depicts a computing system in accordance with an illustrative embodiment.

FIG. 5 depicts a computing system 500 in accordance with an illustrative embodiment. For example, the computing system 500 may represent a device, such as the wireless device 104 of FIG. 1. The computing system 500 includes a processor unit 501 (possibly including multiple processors, multiple cores, multiple nodes, and/or implementing multithreading, etc.). The computing system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement embodiments described above. The system memory 507 may include one or more functionalities that facilitate retrieval of the audio information associated with an identifier. Code may be implemented in any of the other devices of the computing system 500. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for detecting a touch event, comprising:
providing a wireless earpiece having an earpiece housing, a processor disposed within the earpiece housing, at least one accelerometer operatively connected to the processor and disposed within the earpiece housing, at least one microphone operatively connected to the processor, and an external surface of the earpiece housing having a pattern of micro-extensions extending from the external surface of the wireless earpiece accessible to a user when the user is wearing the wireless earpiece, wherein the touch event comprises a movement of at least one finger of a user of the wireless earpiece on the external surface of the wireless earpiece;
sensing vibrations of the at least one finger of the user on the external surface of the earpiece housing as the at least one finger of the user moves along the pattern of micro-extensions using the at least one accelerometer of the wireless earpiece during the touch event, wherein the accelerometer is configured to detect vibrations in an x, y, and z axis;
sensing the sound of the at least one finger of the user as the at least one finger of the user moves along the pattern of micro-extensions using the at least one microphone during the touch event;
analyzing the vibrations and the sound to detect the touch event when the analyzing is performed by the processor disposed within the wireless earpiece;
determining an action for the wireless earpiece associated with the touch event by the processor of the wireless earpiece; and
implementing the action associated with the touch event by the processor of the wireless earpiece.

2. The method of claim 1, wherein the step of analyzing comprises:
comparing sensor measurements from the at least one accelerometer and the at least one microphone with control data to determine the touch event.

3. The method of claim 1, wherein the pattern of micro-extensions affects the vibrations sensed by the accelerometers.

4. The method of claim 1, further comprising the step of determining an initial location of the at least one finger of the user and determining the motion of the finger of the user using the vibrations sensed by the at least one accelerometer of the wireless earpiece.

5. The method of claim 1, further comprising the step of:
determining an environment associated with the user generating the touch event to perform the analyzing.

6. The method of claim 1, further comprising the step of:
identifying the user utilizing the at least one accelerometer and at least one microphone of the wireless earpiece; and authorizing the touch event to be analyzed in response to determining the user is authorized to perform the touch event based on the identity of the user.

7. A wireless earpiece, comprising:
a frame for fitting in an ear of a user;
a processor disposed within the frame of the wireless earpiece controlling functionality of the wireless earpiece;
an accelerometer disposed within the frame of the wireless earpiece and operatively connected to the processor sensing movement of at least one finger of the user on an external surface of the frame of the wireless earpiece during a touch event, wherein the accelerometer is configured to sense vibrations of the at least one finger of the user as the at least one finger of the user moves across the external surface of the frame of the wireless earpiece on an x, y, and z axis;
at least one microphone operatively connected to the processor for sensing the sound of the at least one finger of the user as the at least one finger of the user moves across the external surface of the housing of the wireless earpiece during the touch event;
a pattern of micro-extensions extending from a portion of the frame of the wireless earpiece accessible to the user when the user is wearing the wireless earpiece and positioned relative to the accelerometer and the at least one microphone such that movement of the at least one finger of the user on the micro-extensions is sensed by the accelerometer and the at least one microphone during the touch event; and
wherein the processor analyzes the vibration sensed by the accelerometer and the sound sensed by the at least one microphone created by the pattern when the touch event occurs, the processor further determines an action associated with the touch event, and implements the action associated with the touch event.

8. The wireless earpiece of claim 7, wherein an alert indicates the action is being implemented.

9. The wireless earpiece of claim 7, wherein the processor compares sensor measurements from the accelerometer and the at least one microphone with control data to determine the touch event.

10. The wireless earpiece of claim 7, wherein the processor senses a physical activity while the user generates the touch event, the physical activity separate from the touch event.

11. The wireless earpiece of claim 10, wherein the physical activity consists of one of running, walking, biking, and swimming.

12. The wireless earpiece of claim 7, wherein the processor further identifies the user utilizing the accelerometer and the at least one microphone of the wireless earpiece, and authorizes the touch event to be analyzed in response to determining the user is authorized to perform the touch event based on the identity of the user.

13. The wireless earpiece of claim 7, wherein the one or more accelerometers are configured to sense an initial position of the at least one finger of the user.

14. A wireless earpiece comprising:
a processor disposed within the wireless earpiece for executing software; and
a memory disposed within the wireless earpiece and operatively connected to the processor for storing the software, wherein the software is executed to:
detect a touch event on the wireless earpiece, wherein the touch event is sensed by one or more of accelerometers disposed within the wireless earpiece and operatively connected to the processor for sensing a vibration created by the touch event on a raised grid of micro-extensions rising from an external surface of the wireless earpiece and at least one microphone operatively connected to the processor for sensing sound at the external surface of the wireless earpiece, the sound created by the touch event on the raised grid of micro-extensions;
analyze the touch event sensed by the one or more accelerometers and the at least one microphone;
determine an action associated with the touch event; and
implement the action associated with the touch event;
wherein the touch event comprises movement from at least one finger of the user on the external surface of the frame of the wireless earpiece;
wherein the one or more accelerometers measure at least an initial position of the at least one finger of the user during the touch event;
wherein the raised grid of micro-extensions is positioned relative to the one or more accelerometers and the at least one microphone such that touch movement on or across the micro-extensions is sensed by the one or more accelerometers and the at least one microphone.

15. The wireless earpiece of claim 14, wherein to analyze the touch event includes comparing sensor measurements from the one or more accelerometers and the at least one microphone with control data to determine the touch event provided by the user.

* * * * *